United States Patent
Machado et al.

(10) Patent No.: US 7,159,819 B2
(45) Date of Patent: Jan. 9, 2007

(54) MOUNTING STRUCTURE FOR MOUNTING A TURBOPROP UNDER AN AIRCRAFT WING

(75) Inventors: Stephane Machado, Villeneuve-Tolosane (FR); Jerome Cassagne, Toulouse (FR); Anthony Del Blanco, Toulouse (FR); Yvon Martin, Bonrepos Riquet (FR); Arnaud Chambreuil, Labastide Saint Sernin (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/987,151

(22) Filed: Nov. 15, 2004

(65) Prior Publication Data

US 2005/0116093 A1   Jun. 2, 2005

(30) Foreign Application Priority Data

Dec. 1, 2003   (FR) .................................. 03 50946

(51) Int. Cl.
*B64D 27/00* (2006.01)

(52) U.S. Cl. ....................................................... 244/54
(58) Field of Classification Search .............. 244/53 R, 244/54, 55; 180/299, 300; 248/554–557
See application file for complete search history.

(56) References Cited

U.S. PATENT DOCUMENTS

| | | | | |
|---|---|---|---|---|
| 1,544,358 A * | 6/1925 | Thomas | ....................... | 248/554 |
| 1,641,306 A * | 9/1927 | Van Valkenberg | ........... | 248/554 |
| 1,705,492 A * | 3/1929 | Noble | ........................... | 244/54 |
| 1,860,444 A * | 5/1932 | Woolson | ..................... | 248/557 |
| 2,234,394 A * | 3/1941 | Amiot | ........................... | 244/54 |
| 2,343,426 A * | 3/1944 | Tyler | ........................... | 248/556 |
| 2,355,370 A * | 8/1944 | Frey | ........................... | 248/554 |
| 2,359,822 A * | 10/1944 | Boss | ........................... | 248/555 |
| 2,411,562 A * | 11/1946 | Thompson | ................... | 248/556 |
| 2,529,958 A * | 11/1950 | Owner et al. | .................. | 60/797 |
| 2,539,960 A * | 1/1951 | Marchant et al. | .......... | 60/39.15 |
| 2,589,539 A * | 3/1952 | Childress | ..................... | 244/54 |
| 2,591,393 A * | 4/1952 | Anderson | ................... | 248/555 |
| 2,828,607 A * | 4/1958 | Johnson | ........................ | 60/791 |
| 2,965,338 A * | 12/1960 | McLean | ..................... | 248/556 |
| 2,968,920 A * | 1/1961 | Wayne et al. | ................. | 60/761 |
| 3,067,968 A * | 12/1962 | Heppenstall | .............. | 244/53 R |
| 3,204,717 A * | 9/1965 | Collins | ........................ | 180/256 |
| 3,240,454 A * | 3/1966 | Ormond | ..................... | 248/555 |
| 3,327,971 A * | 6/1967 | Stewart et al. | ................ | 244/54 |
| 3,502,287 A * | 3/1970 | Lindsay | ....................... | 244/54 |
| 4,013,246 A * | 3/1977 | Nightingale | ................. | 244/54 |
| 4,437,627 A * | 3/1984 | Moorehead | .................. | 244/54 |
| 4,742,975 A * | 5/1988 | Pachomoff et al. | ........... | 244/54 |
| 4,917,331 A * | 4/1990 | Hager et al. | .................. | 244/54 |
| 5,054,715 A * | 10/1991 | Hager et al. | .................. | 244/54 |

(Continued)

FOREIGN PATENT DOCUMENTS

EP   0 437 868 A1   7/1991

*Primary Examiner*—Teri Pham Luu
*Assistant Examiner*—Stephen A Holzen
(74) *Attorney, Agent, or Firm*—Oblon, Spivak, McClelland, Maier & Neustadt, P.C.

(57) ABSTRACT

A mounting structure for mounting a turboprop under an aircraft wing includes a rigid structure provided with an aft underwing box, and at least one forward rigid section. Each forward rigid section has two transverse frames at a spacing from each other. At least one forward rigid section of the rigid structure also includes at least one forward upper box connecting a top part of the two transverse frames of the forward rigid section.

18 Claims, 2 Drawing Sheets

U.S. PATENT DOCUMENTS

| | | | |
|---|---|---|---|
| 5,452,575 A * | 9/1995 | Freid | 60/797 |
| 5,524,847 A * | 6/1996 | Brodell et al. | 244/54 |
| 5,746,391 A * | 5/1998 | Rodgers et al. | 244/54 |
| 5,806,792 A * | 9/1998 | Brossier et al. | 244/54 |
| 6,095,456 A | 8/2000 | Powell | |
| 6,123,293 A * | 9/2000 | Breitbach et al. | 244/54 |
| 6,126,110 A * | 10/2000 | Seaquist et al. | 244/54 |
| 6,330,985 B1 * | 12/2001 | Manteiga et al. | 244/54 |
| 6,398,161 B1 * | 6/2002 | Jule et al. | 244/54 |
| 2003/0066928 A1 * | 4/2003 | Brefort et al. | 244/54 |
| 2004/0227033 A1 * | 11/2004 | Picard et al. | 244/54 |
| 2004/0245383 A1 * | 12/2004 | Udall | 244/54 |
| 2005/0116093 A1 * | 6/2005 | Machado et al. | 244/54 |
| 2005/0151008 A1 * | 7/2005 | Machado et al. | 244/54 |
| 2005/0178888 A1 * | 8/2005 | Machado et al. | 244/54 |
| 2005/0178889 A1 * | 8/2005 | Machado et al. | 244/54 |
| 2005/0274485 A1 * | 12/2005 | Huggins et al. | 164/349 |
| 2006/0027705 A1 * | 2/2006 | Machado et al. | 244/54 |

* cited by examiner

MOUNTING STRUCTURE FOR MOUNTING A TURBOPROP UNDER AN AIRCRAFT WING

BACKGROUND OF THE INVENTION

1. Field of the Invention

Technical Domain

This invention relates to a structure for mounting or suspending a turboprop under an aircraft wing.

This type of structure may be used on any type of aircraft comprising turboprops suspended under its wing. In this respect, it is particularly suitable for use on aircraft fitted with turboprops capable of outputting high power, more than 10000 horsepower.

2. Description of the Related Art

On existing aircraft, engines are suspended under or are mounted above the wing by complex Engine Mounting Structures (EMS).

These structures are designed particularly to transmit static and dynamic forces generated by engines, such as weight, thrust or different dynamic forces, to the wing.

In the special case of a turboprop, three main criteria are taken into account to design the associated mounting structure, namely resistance to engine torque, the mass of this structure and finally the limitation to the displacement of the turboprop nozzle relative to the mounting structure.

In prior art, a turboprop is conventionally suspended under an aircraft wing by using a mounting structure comprising a rigid structure provided with an aft under-wing box, and one or several rigid segments arranged in sequence towards the forward end along the longitudinal direction of the engine. As an illustrative example, in this type of so-called statically indeterminate solution, the structure can include two rigid forward segments.

In this configuration, each rigid forward segment has two transverse frames at a spacing from each other, and connected to each other by a plurality of connecting rods, which then jointly form a so-called "lattice structure" with the transverse frames.

This solution is satisfactory for a mounting structure designed to suspend a turboprop within a normal power range, particularly due to its ability to resist the engine torque generated during operation of the associated turboprop.

Nevertheless, recent aircraft development has lead particularly to the use of extremely high power turboprops compared with power values encountered in the past, these power values possibly being more than 10000 horsepower or even more than 13000 horsepower.

Studies carried out showed that considering technical feasibility limits for connecting rods for a conventional lattice type structure, this type of structure cannot resist the entire engine torque generated for such high power values, which can be more than 230000 N.m.

SUMMARY

Therefore, the purpose of the invention is to propose a turboprop mounting structure under an aircraft wing, this structure at least partially correcting the disadvantages mentioned above related to structures according to prior art.

In particular, the purpose of the invention is to present a mounting structure for a high power turboprop capable of satisfying requirements related to resistance of the engine torque generated during operation of the turboprop, and the mass of this structure and limitation of the displacement of the nozzle of this turboprop relative to the mounting structure.

To achieve this, the object of the invention is a turboprop mounting structure under an aircraft wing, comprising a rigid structure provided with an aft under-wing box and at least one forward rigid segment, each forward rigid segment comprising two transverse frames at a spacing from each other. According to the invention, at least one forward rigid segment of the rigid structure also comprises at least one forward upper box connecting a top part of the two transverse frames of the forward rigid segment.

Advantageously, it has been observed that the placement of such a forward box between the top part of two transverse frames made it fairly easy to resist the engine torque generated by a high power turboprop, for example with a power of more than 13 000 hp, unlike previously proposed solutions with a lattice structure.

Moreover, the mounting structure according to the invention is advantageous in the sense that its design also enables it to satisfy mass and displacement limitation criteria for the engine nozzle.

It is also noted that the ability to easily resist the entire engine torque is achieved particularly by the possibility of designing the structure such that the forward upper box(es) and the aft under-wing box jointly form an assembly with fairly good geometric continuity, thus providing continuity in resisting the forces passing through a top part of the structure. Obviously, this continuity was impossible to obtain with structures according to prior art due to the fact that the forces had to pass between the forward part and the aft part of the rigid structure of the structure, namely between the lattice structure and the under-wing box.

Moreover, studies carried out have demonstrated that the presence of a forward upper box on at least one rigid segment enabled the resistance of at least 80% of the engine torque by the forward fasteners normally located on the turboprop reduction gear. Obviously, this resistance of at least 80% of the torque was achieved with a mounting structure with an optimum mass.

Finally, it is noted that the design of the mounting structure according to the invention is advantageously quite conservative to enable vertical placement of the turboprop on this structure, this placement then being made by bringing the turboprop into place from underneath and lifting it vertically as far as the mounting structure that is held fixed.

According to a first preferred embodiment of this invention, at least one forward rigid segment of the rigid structure comprises also at least two lateral connecting rods arranged on each side of the forward upper box, these connecting rods connecting the two transverse frames of the forward rigid segment.

This hybrid configuration comprising at least one forward upper box and a plurality of side connecting rods, like those used in a conventional lattice structure, enables very good resistance of the engine torque, since it is then also partially absorbed by the lateral connecting rods provided for this purpose. Advantageously, the presence of a restricted number of lateral connecting rods does not significantly increase the global mass of the mounting structure, and enables satisfactory access to the turboprop, particularly to mount conventional equipment onto it.

In this first preferred embodiment of the present invention, the lateral connecting rods are indifferently articulated onto fittings fixed to the transverse frames, or embedded in these transverse frames.

As an illustrative example, at least one forward rigid segment of the rigid structure, and preferably each segment when there are two or more of them, includes only four lateral connecting rods arranged on each side of the forward upper box. Naturally, these connecting rods were designed particularly to resist the engine torque, and are therefore preferably arranged symmetrically about a vertical plane passing through the longitudinal axis of the turboprop.

According to a second preferred embodiment of this invention, at least one forward rigid segment of the rigid structure also comprises at least two forward side boxes arranged on each side of the forward upper box, these forward side boxes connecting the two transverse frames of the forward rigid segment.

This other configuration, in which at least one forward rigid segment is made such that its two transverse frames are exclusively connected through boxes, enables excellent resistance of the engine torque.

Still as an illustrative example, at least one forward rigid segment of the rigid structure, and preferably each of them when there are more than two, includes only two forward lateral boxes arranged on each side of the forward upper box. In this case, the forward lateral boxes are designed particularly to resist the engine torque, therefore they are preferably arranged symmetrically about a vertical plane passing through the longitudinal axis of the turboprop.

For both preferred embodiments described above, it is preferable that the structure, and more specifically its rigid part, comprises two forward rigid segments with a common intermediate transverse frame.

Furthermore, each forward rigid segment may comprise a single forward upper box connecting the upper part of the two transverse frames of this forward rigid segment.

Furthermore, and still preferably, each forward upper box comprises a lower stringer, an upper stringer, two side plates, and a plurality of transverse inner ribs connecting the stringers and the plates.

Finally, each forward upper box could be made from titanium.

Other advantages and special features of the invention will become clearer in the non-limitative detailed description given below.

BRIEF DESCRIPTION OF THE DRAWINGS

This description will be made with reference to the appended figures, wherein.

DETAILED DESCRIPTION OF THE PREFERRED EMBODIMENTS

Figure 1:
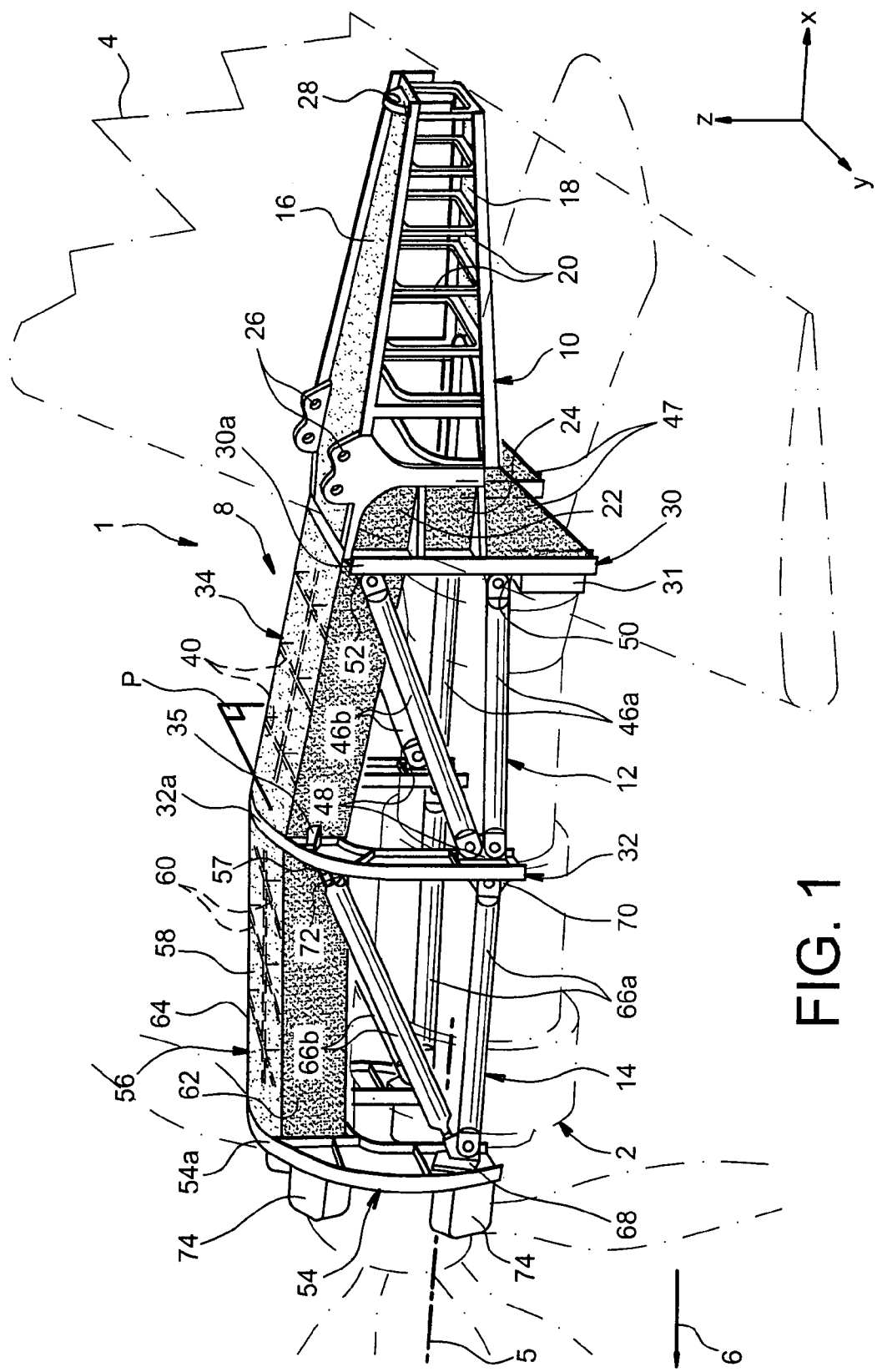
FIG. 1 shows a perspective view of the rigid structure of a turboprop mounting structure according to a first preferred embodiment of this invention.

FIG. 1 shows a mounting structure 1 according to a first preferred embodiment of this invention, this structure 1 being designed to suspend a turboprop 2 under an aircraft wing shown only diagrammatically for obvious reasons of clarity, and generally denoted by the numeric reference 4.

Throughout the following description, by convention, X is the direction parallel to a longitudinal axis 5 of the turboprop 2, Y is the transverse direction relative to the aircraft, and Z is the vertical direction, these three directions being orthogonal to each other. Note that the longitudinal axis 5 of the turboprop 2 should be considered as being the longitudinal axis of the engine casing, and not the longitudinal axis of its propeller (not referenced).

Secondly, the terms "forward" and "aft" should be considered with respect to a direction of progress of the aircraft as a result of the thrust applied by the turboprops 2, this direction being shown diagrammatically by the arrow 6.

Only one rigid structure 8 of the mounting structure 1 is shown in FIG. 1. Other components of this mounting structure 1 that are not shown, of the secondary structure type, segregate and hold the systems while supporting aerodynamic fairings, and are conventional elements identical or similar to those encountered in prior art and known to those skilled in the art. Consequently, no detailed description of them will be made.

In this first preferred embodiment of the present invention, the rigid structure 8 comprises the following, in sequence from the aft to the forward end along the longitudinal axis 5 of the turboprop 2, an aft under-wing box 10, a first forward upper segment 12, and a second forward upper segment 14.

The aft under-wing box 10 is of the same type as those encountered in turboprop mounting structures according to prior art, and well known to those skilled in the art.

As an illustrative example, this under-wing box 10 may comprise an upper stringer 16 and a lower stringer 18 both extending approximately along the X direction and approximately in XY planes, these stringers 16 and 18 being connected to each other through a plurality of transverse ribs 20 at a spacing from each other and arranged in the YZ planes. Nevertheless, as is shown in FIG. 1, it is possible for the stringers 16 and 18 to be located in planes slightly inclined from the XY planes. The upper stringer 16 is arranged so as to come closer to the longitudinal axis 5 of the turboprop 2 while extending in the aft direction, while the lower stringer 18 is arranged to move away from this longitudinal axis 5, extending in the aft direction.

Furthermore, it is noted that conventionally and in a known manner, the transverse ribs 20 are each in the form of a rectangle.

Furthermore, the under-wing box 10 comprises two side plates closing the box, each of these two side plates being composed possibly of several portions of plane vertical side plates. In FIG. 1, only two side plate portions have been shown for one of the two side plates of the under-wing box 10, namely one forward upper portion 22 and one lower forward portion 24. The aft portions of this plate have been deliberately omitted for reasons of clarity. Nevertheless, note for information that the forward portions 22 and 24 of the side plates are approximately in the same plane and preferably arranged so that they come closer to the longitudinal axis 5 of the turboprop 2 extending forwards, while the aft portions of the side plate are also located approximately in the same plane, but are preferably arranged so that they come closer to this longitudinal axis 5 extending towards the aft direction.

Furthermore, as can be clearly seen in FIG. 1, the aft under-wing box 10 has a forward fastener 26 that will be used to mount the structure 1 under the wing 4 of the aircraft, at the separation between the forward and aft portions of each of the two plates. For example, each fastener 26 is in the form of a fitting extending upwards in an XY plane from the upper stringer 16, at one side end of it.

In this respect, an aft fastener 28 may also be provided for mounting the structure 1 under the wing 4 jointly with the two forward fasteners 26, this fastener 28 then being in the form of a fitting extending upwards in a YZ plane from the upper stringer 16, at an aft end of the upper stringer.

At the forward end, the under-wing box 10 may be closed off by a first transverse frame 30 located in a YZ plane, this first transverse frame 30 preferably being in the shape of an inverted U, and also forming an integral part of the first forward rigid segment 12.

For information, the first transverse frame 30 carries an aft fastener that will be used to mount the turboprop 2 onto the mounting structure 1, and therefore more specifically onto its rigid structure 8. This aft fastener is diagrammatically shown and indicated by the numeric reference 31 in FIG. 1 and is of the conventional type, namely is identical to or similar to those found on mounting structures according to prior art. Consequently, no detailed description will be given.

The first forward rigid segment 12 effectively comprises a second transverse frame 32 in association with the first transverse frame 30, also located in a YZ plane and in the form of an inverted U, its two branches facing downwards and being located below its base. Naturally, this inverted U shaped configuration was adopted so that when in a mounted condition, the turboprop 2 can be arranged between the two branches of each U.

Moreover, this rigid segment 12 is provided with a first forward upper box 34 connecting a top part of the two transverse frames 30 and 32, and more specifically the two bases 30a and 32a of the inverted Us formed by these same frames 30 and 32 respectively. It is noted that in this first preferred embodiment, a single box 34 connects the upper part of the two transverse frames 30 and 32. However, without departing from the scope of the invention, it would be natural to provide several forward boxes to connect the top part of these two frames 30 and 32.

As will be described in more detail below, the first forward upper box 34 is approximately parallelepiped shaped and extends approximately in the X direction. For reasons of the size of the turboprop 2, it would also be possible for the first forward upper box 34 to be arranged such that it comes slightly closer to the longitudinal axis 5 extending towards the aft direction, as can be seen in FIG. 1.

Since this box 34 is specially designed to resist the engine torque of the turboprop 2, it is preferable if a vertical plane (not shown) passing through the longitudinal axis 5 cuts the first forward upper box 34 into two identical parts symmetric about this plane. In this respect, more generally, the entire rigid structure 8 of the mounting structure 1 is designed such that the vertical plane passing through the longitudinal axis 5 delimits two identical structure parts symmetric about this vertical plane.

The first forward upper box 34 is preferably held fixed onto transverse frames 30 and 32 through fittings 35 on which the box 34 may for example be welded, these fittings 35 (only one of them being visible in FIG. 1 due to the perspective view) themselves preferably being welded onto the U shaped frames 30 and 32, close to the intersections between the branches and the associated bases 30a and 32a of these Us. Obviously, the fittings 35 could also be provided as a single piece with the transverse frames 30 and 32, without departing from the scope of the invention.

Figure 2:
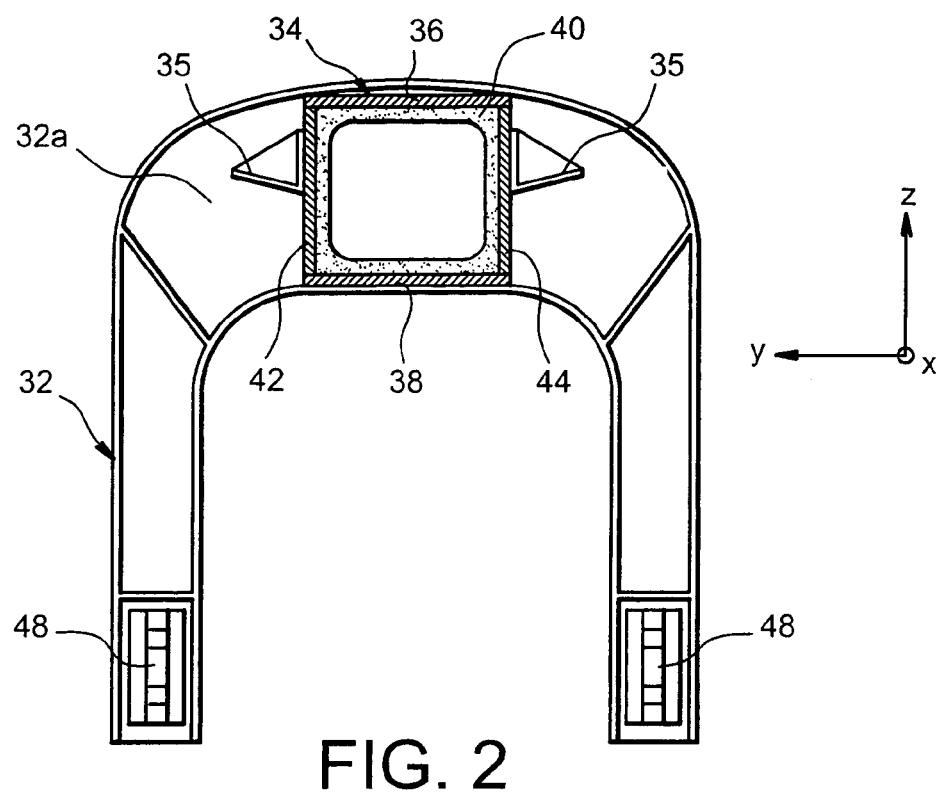
FIG. 2 shows a sectional view along plane P in FIG. 1.

With reference more particularly to FIG. 2, it can be seen that the first forward upper box 34 in the shape of a parallelepiped includes an upper stringer 36 and a lower stringer 38 each extending in parallel planes slightly inclined from the XY planes, namely arranged so as to come closer to the longitudinal axis 5 of the turboprop 2, extending towards the aft direction.

However, it would also be possible to arrange the design such that the stringers 36 and 38 each extend approximately in the X direction and approximately in the XY planes, without departing from the scope of the invention.

The stringers 36 and 38 are connected to each other through a plurality of transverse ribs 40 at a spacing from each other and arranged in the YZ planes, each of these ribs 40 being in the form of a rectangle.

Moreover, the first forward upper box 34 comprises two side plates 42 and 44 extending in ZX planes, and also being fixed to transverse ribs 40 located within an approximately parallelepiped shaped space formed by the side plates 42, 44 and the stringers 36, 38.

Finally, it is noted that the box 34 can be closed off at its forward and aft ends by vertical walls located in the YZ planes, or simply they can be closed off by bases 30a and 32a of the transverse frames 30 and 32 respectively on which this box 34 is mounted.

Preferably, all elements forming part of the first forward upper box 34 are made of titanium, or carbon.

As can be seen in FIG. 1, it could be arranged such that the forward portions 22 and 24 of each of the two side plates of the aft under-wing box 10 are located along the extension of two side plates 42 and 44 of the first forward box 34, to assure continuity in the resistance of forces. Furthermore, as an example not shown, it would even be possible for each side of the rigid structure 8, that the forward portions 22 and 24, and the side plate 42, 44 separated by the first transverse frame 30, are arranged approximately in the same vertical plane.

Similarly, still with the objective of providing continuity in the resistance of forces, it would be possible that the upper stringer 16 of the aft under-wing box 10 is approximately along the extension of the top stringer 36 (not shown in FIG. 1) of the first forward box 34. Once again, still as an example not shown, it would be possible for the top stringers 16 and 36 separated by the first transverse frame 30, to be arranged approximately in the same horizontal plane.

Once again with reference to FIG. 1, it can be seen that in this first preferred embodiment of the present invention, the transverse frames 30 and 32 are not only connected through the first forward upper box 34, but also through four connecting rods 46a, 46b, the number of connecting rods obviously not being limitative in any way.

The four connecting rods 46a, 46b are arranged symmetrically about the vertical plane passing through the longitudinal axis 5 of the turboprop 2. Consequently, two connecting rods 46a, 46b on each side of the rigid structure 8 of the structure 1, jointly resist the engine torque with the first box 34.

To achieve this, a first connecting rod 46a on each side of the rigid structure 8 is placed firstly approximately along the X direction, and is connected to a lower end of a branch of the U formed by the second frame 32. Furthermore, this first connecting rod 46a can be arranged such that it forms an extension of the lower stringer 18 of the under-wing box 10. In other words, the aft end of this connecting rod 46a is preferably approximately in the plane defined by the lower stringer 18. As can be seen clearly in FIG. 1, the aft end of the connecting rod 46a and the lower stringer 18 are connected through the transverse frame 30 and through a vertical side plate 47 in the form of a bracket fixed to the under-wing box 10 and to the arm of the U concerned, in the direction towards the aft end in sequence, this side plate 47 coming closer to the longitudinal axis 5 moving towards the aft direction.

Furthermore, this connecting rod 46a is preferably located in a horizontal median plane (not shown) of the turboprop 2, passing through its longitudinal axis 5.

Secondly, a second connecting rod 46b is also connected to the lower end of the same arm of the U formed by the second frame 32, the two connecting rods 46a and 46b preferably being connected to the same fitting 48. However, this second connecting rod 46b is not arranged along the X direction, but is connected to the base 30a of the first U-shaped transverse frame 30, or close to the intersection between the base and the arm concerned of this U. Therefore, the second connecting rod 46b is placed so that it comes closer to the vertical plane passing through the longitudinal axis 5, extending simultaneously in the aft direction and upwards. Obviously, "upwards" in this case means the Z direction, from the turboprop 2 towards the first forward upper box 34.

Two fittings 50 and 52 are also provided on the first transverse frame 30 to mount the two connecting rods 46a and 46b respectively.

Consequently, the four connecting rods 46a, 46b arranged symmetrically may be mounted articulated on their corresponding fittings 48, 50 and 52, or may simply be welded to them to embed them.

Finally, one or more intermediate connecting rods (not shown) could also be placed connecting the first and the second connecting rods 46a and 46b on each side of the rigid structure 8, obviously with the purpose of reinforcing the mechanical strength of this rigid structure 8.

As indicated above, this rigid structure 8 also comprises a second forward rigid segment 14, approximately the same as the first rigid segment 12 that has just been described.

The second forward rigid segment 14 comprises the second transverse frame 32, and a third transverse frame 54 also located in the YZ plane and in the shape of an inverted U, its two arms facing downwards and being located below its base, as is also the case for the other two frames 30 and 32. Under these conditions, the third frame 54 approximately aligned with the other two frames being located forwards from the second frame 32, this second frame then acts as an intermediate frame jointly forming part of the two forward rigid segments 12 and 14.

This rigid segment 14 is provided with a second forwards upper box 56 connecting an upper part of the two transverse frames 32 and 54, and more specifically the two bases 32a and 54a of the inverted Us formed by these same frames 32 and 54 respectively.

It is noted that in this first preferred embodiment, a single box 54 connects the top part of the two transverse frames 32 and 54. Nevertheless, once again, several forward boxes could be provided to connect the top part of these two frames 32 and 54, without departing from the scope of the invention.

In the same way as for the first forward upper box 34, the second forward upper box 56 is approximately parallelepiped shaped and extends approximately along the X direction. For reasons of size of the turboprop 2, it would be possible for the second forward upper box 56 to be arranged so that it comes slightly closer to the longitudinal axis 5 in the forward direction, as can be seen in FIG. 1.

Also, once again such that the forward upper box 56 can satisfactorily resist the driving torque of the turboprop 2, it is preferable if the vertical plane passing through the longitudinal axis 5 cuts this box 56 into two identical parts symmetric about this same plane.

The second forward upper box 56 is preferably held fixed on the transverse frames 32 and 54 through fittings 57, for example on which the box 56 is welded, these fittings 35 (only one of them being shown in FIG. 1) due to the perspective representation) preferably being welded onto the U-shaped frames 32 and 54 close to the intersections between the arms and the associated bases 32a and 54a of these Us.

In the same way as for the first box 34, the second forward upper parallelepiped-shaped box 56 comprises an upper stringer 58 and a lower stringer (not shown in FIG. 1), each extending in parallel planes slightly inclined from the XY planes, namely arranged so as to come closer to the longitudinal axis 5 extending towards the forward direction.

However, it would also be possible for the lower and upper stringers 58 to extend approximately along the X direction and approximately in the XY planes, without departing from the scope of the invention.

Moreover, these stringers are connected to each other through several transverse ribs 60 at a spacing from each other and arranged in YZ planes, these transverse ribs 60 each being in the form of a rectangle.

Furthermore, the second forward upper box 56 comprises two side plates 62 and 64 extending in the ZX planes, and also being fixed to the transverse ribs 60 located inside an approximately parallelepiped shaped space formed by the plates 64, 64 and the stringers 58.

Finally, it is noted that the box 56 can be closed off at its forward and aft ends by vertical walls located in the YZ planes, or can be closed off simply by bases 32a and 54a respectively of the transverse frames 32 and 54 on which this box 56 is mounted.

Preferably, all components of the second forward upper box 56 are made of titanium, or carbon.

As can be seen in FIG. 1, it would be possible for the two side plates 42, 44 of the first forward box 34 to be located along the extension of the two side plates 62 and 64 of the second forward box 56, to ensure continuity in the resistance of forces. Moreover, it would be possible for the side plates 62, 64 and the side plate 42, 44 separated by the second transverse frame 32, to be arranged approximately in the same vertical plane, for each side of the rigid structure 8.

Similarly, still with the same purpose of ensuring continuity in the resistance of forces, it would be possible for the top stringer 36 (not shown in FIG. 1) of the first forward box 34 to be located along the extension of the top stringer 58 of the second forward upper box 56. Once again, as an illustrative example not shown, it would be possible for the upper stringers 36 and 58 separated by the second transverse frame 32, to be arranged approximately in the same horizontal plane. Obviously, this possibility is also applicable for the two lower stringers of the first and second boxes 34 and 56, as can be seen in FIG. 1.

In this first preferred embodiment of the present invention, the transverse frames 32 and 54 are not only connected through the first forward upper box 34, but also through four connecting rods 66a, 66b arranged in the same way as the connecting rods 46a, 46b of the first segment 12.

Consequently, the four connecting rods 66a, 66b are arranged symmetrically about the vertical plane passing through the longitudinal axis 5, and it is arranged that two connecting rods 66a, 66b on each side of the rigid structure 8 of the mounting 1, work jointly with the second box 56 to resist the engine torque.

To achieve this, a first connecting rod 66a on each side of the rigid structure 8 is firstly placed approximately along the X direction, and is connected to a lower end of a branch of the U formed by the third frame 54. Furthermore, this first connecting rod 66a may be arranged along the extension of the first connecting rod 46a of the first segment 12, as can clearly be seen in FIG. 1.

Furthermore, a second connecting rod 66b is also connected to the lower end of the same branch of the U formed by the third frame 54, the two connecting rods 66a and 66b preferably being connected to the same fitting 68. However, this second connecting rod 66b is not arranged along the X direction, but is connected to the base 32a of the second transverse U-shaped frame 32, or close to the intersection between the base and the branch concerned of this U. In other words, the second connecting rod 66b is placed so as to come closer to the vertical plane passing through the longitudinal axis 5, simultaneously towards the aft direction and upwards. Naturally, in this case "upwards" means in the Z direction of the turboprop 2 towards the second forward upper box 56.

Two fittings 70 and 72 are also provided on the second transverse frame 32 to mount the aft ends of the two connecting rods 66a and 66b, respectively.

In the same way as for the first segment 12, the four connecting rods 66a, 66b arranged symmetrically may be mounted articulated on their corresponding fittings 68, 70 and 72, or simply welded to them, in order to achieve embedments.

Once again, one or more intermediate connecting rods (not shown) could be put into place connecting the first and the second connecting rods 66a and 66b on each side of the rigid structure 8.

Still with reference to FIG. 1, it can be seen that the third transverse frame 54 is provided with forward fasteners 74 for mounting of the turboprop 2 onto the mounting structure 1, and more specifically onto its rigid structure 8. For guidance, the forward fasteners 74 are generally distributed around a reduction gear of the turboprop 2.

Finally, the rigid structure 8 can be designed such that the two approximately identical forward rigid segments 12 and 14, and the aft under-wing box 10, are all approximately the same length in the longitudinal direction, which may be of the order of 1400 mm.

Figure 3:
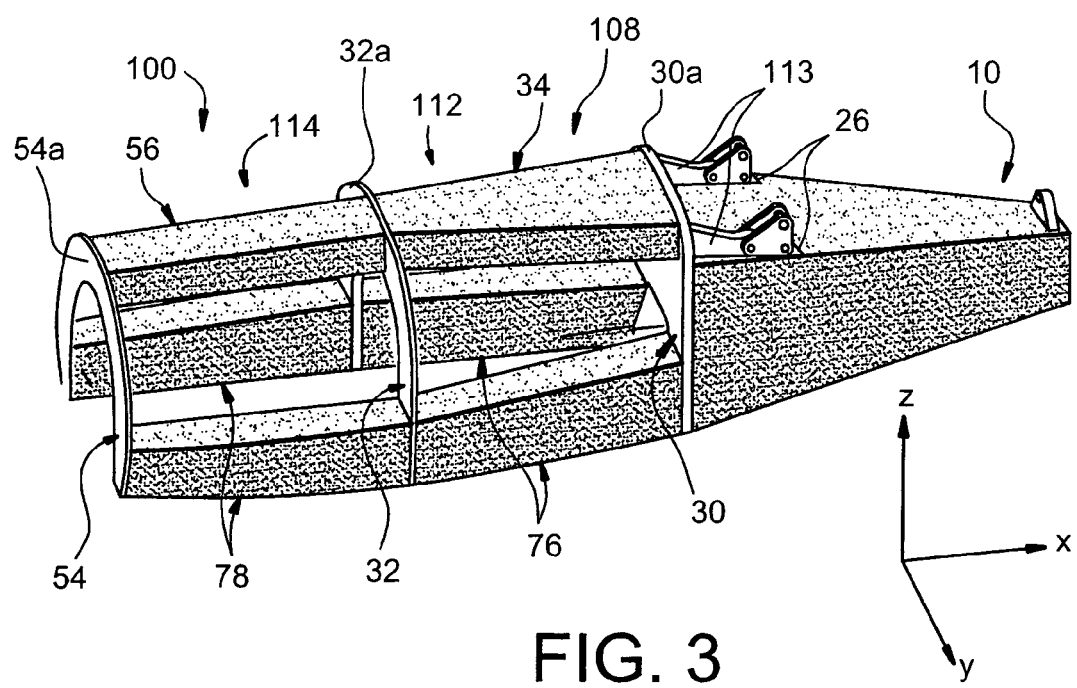
FIG. 3 shows a perspective view of the rigid structure of a turboprop mounting structure according to a second preferred embodiment of this invention.

FIG. 3 shows a mounting structure 100 according to a second preferred embodiment of this invention, this structure 100 being designed for suspension of a turboprop under an aircraft wing (not shown in this Figure).

Firstly, note that the mounting structure 100 has a rigid structure 108 approximately similar to the rigid structure 8 of the mounting structure 1 according the first preferred embodiment of this invention. The elements in FIGS. 1 to 3 marked with the same numeric references correspond to identical or similar elements.

Thus, as can be seen in this FIG. 3, the rigid structure 108 comprises, in sequence along the longitudinal axis of the turboprop in the forward direction, an aft under-wing box 10 similar to that described above, a first forward rigid segment 112, and a second forward rigid segment 114.

In the same way as for the first forward rigid segment 12 in the first preferred embodiment, the first forward rigid segment 112 comprises the first transverse frame 30, the second transverse frame 32, and the first forward upper box 34 connecting the upper part 30a, 32a of the two frames 30 and 32. Note that the first forward upper box 34 is slightly different from that described in the first preferred embodiment, to the extent that it has a slightly trapezoidal shape in a top view, its aft end being more flared than its forward end. Its side plates (not referenced) move away from the vertical plane passing through the longitudinal axis of the engine in the aft direction, and may then be located along the extension of two vertical ribs 113 approximately along the longitudinal direction X, these two ribs 113 forming the junction between the transverse frame 30 and the forward fasteners 26. Obviously, each forward fastener 26 and its associated rib 113 may be made in a single piece.

Thus, the specific arrangement mentioned above is perfectly suitable for giving very good force transmission.

Furthermore, the transverse frames 30 and 32 are not only connected through the first forward upper box 34, but also through two lateral forward boxes 76, obviously the number of the boxes not being limitative.

The two lateral forward boxes 76 are arranged symmetrically about the vertical plane passing through the longitudinal axis of the turboprop. Consequently, a single lateral box 76 on each side of the rigid structure 108 of the structure 100, resists the engine torque jointly with the first box 34.

To achieve this, the approximately parallelepiped shaped lateral box 76 with a design identical to or similar to the design of the forward upper boxes 34 and 56 described above is placed approximately along the X direction and is connected to a lower end of a branch of the U formed by the second frame 32, and to a lower end of a branch of the U formed by the first frame 30, on each side of the rigid structure 108.

As described above, it is advantageous to have the best possible geometric continuity between the forward side boxes 76 and the aft under-wing box 10, so as to be able to resist the turboprop engine torque as well as possible. In this respect, the geometric continuity for each box 76 may in particular be obtained by assuring that an outer side plate (not referenced) of the box 76 concerned is located along the extension of a vertical side plate (not referenced) of the under-wing box 10, as is clearly visible in FIG. 3. It is noted for information that unlike the aft under-wing box 10 in the first preferred embodiment, the box 10 in FIG. 3 represents a single vertical side plate on each side, coming closer to the longitudinal axis of the turboprop towards the aft direction.

Similarly, such geometric continuity may also be provided between the lower stringers (not referenced) of boxes 10 and 76.

Furthermore, in the same way as for the second forward rigid segment 14 of the first preferred embodiment, the second forward rigid segment 114 comprises the second transverse frame 32, the third transverse frame 54, and the second forward upper box 56 connecting the upper part 32a, 54a of the two frames 32 and 54. These elements are identical to or similar to those described above, and consequently will not be described further.

The transverse frames 32 and 54 are not only connected through the second forward upper box 56, but also through two forward side boxes 78. The two forward side boxes 78 are arranged symmetrically about the vertical plane passing through the longitudinal axis of the turboprop. Consequently, a single side box 78 on each side of the rigid structure 108 of the structure 100 resists the engine torque jointly with the second box 56.

To achieve this, and in exactly the same way as for the first segment 112, the approximately parallelepiped shaped side box 78 on each side of the rigid structure 108 with an identical or similar design to the design of the forward upper boxes 34 and 56 described previously, lies approximately along the X direction. It is also connected to a lower end of the U-shaped branch formed by the second frame 32, and to a lower end of a U-shaped branch formed by the third frame 54.

Finally, it is also very advantageous in this case to provide the best possible geometric continuity between the forward side boxes 76 of the first segment 112 and the forward side boxes 78 of the second segment 114, so as to provide the best possible resistance of the turboprop engine torque. For example, and as illustrated in FIG. 3, the geometric continuity between the side boxes 76 and 78 may easily be obtained by assuring that their upper stringers, their lower stringers and their side plates are in continuity with each other, and possibly in the same planes.

Obviously, those skilled in the art could make various modifications to the mounting structures 1 and 100 that have been described above as non-limitative examples only.

The invention claimed is:

1. A mounting structure for mounting a turboprop under an aircraft wing, said structure comprising: a rigid structure provided with an aft under-wing box, and at least one forward rigid section, each forward rigid section having two transverse frames at a spacing from each other, wherein at least one forward rigid section of the rigid structure also comprises at least one forward upper box connecting a top part of the two transverse frames of said forward rigid section, wherein each forward upper box comprises a lower stringer, an upper stringer, two side plates, and a plurality of transverse inner ribs connecting said stringers and said side plates.

2. A mounting structure according to claim 1 for mounting a turboprop, wherein at least one forward rigid section of the rigid structure also comprises at least two lateral connecting rods arranged on each side of the upper forward box, said at least two lateral connecting rods connecting the two transverse frames of said forward rigid section.

3. A mounting structure according to claim 2 for mounting a turboprop, wherein said lateral connecting rods are articulated on fittings fixed to the transverse frames.

4. A mounting structure according to claim 2 for mounting a turboprop, wherein said lateral connecting rods are embedded in the transverse frames.

5. A mounting structure according to claim 2 for mounting a turboprop, wherein at least one forward rigid section of the rigid structure includes only four lateral connecting rods arranged on each side of the forward upper box.

6. A mounting structure according to claim 1 for mounting a turboprop, wherein at least one forward rigid section of the rigid structure also comprises at least two forward side boxes arranged on each side of the forward upper box, said at least two forward side boxes connecting the two transverse frames of said forward rigid section.

7. A mounting structure according to claim 6 for mounting a turboprop, wherein at least one forward rigid section of the rigid structure includes only two forward side boxes arranged on each side of the forward upper box.

8. A mounting structure according to claim 1 for mounting a turboprop, comprising two forward rigid sections with a common intermediate transverse frame.

9. A mounting structure according to claim 1 for mounting a turboprop, wherein each forward rigid section comprises a single forward upper box connecting the upper part of the two transverse frames of said forward rigid section.

10. A mounting structure according to claim 1 for mounting a turboprop, each forward upper box is made from titanium.

11. A mounting structure for mounting a turboprop under an aircraft wing, said structure comprising an aft under-wing box; a forward section located forward of said aft under-wing box, said forward section including two transverse frames spaced apart from each other, wherein one of said two transverse frames is connected to said aft under-wing box, said forward section comprising a forward upper box extending between said two transverse frames and connecting a top part of each of the two transverse frames of said forward section, wherein said forward upper box comprises a lower stringer extending between said two transverse frames and along a bottom portion of said forward upper box; an upper stringer extending between said two transverse frames and along a top portion of said forward upper box; two side plates, each extending between said two transverse frames and along a side of said forward upper box; and a plurality of transverse ribs connecting said lower stringer, said upper stringer and said two side walls to each other.

12. A mounting structure according to claim 11, wherein said forward upper box is closed.

13. A mounting structure according to claim 11, wherein said forward upper box forms an approximately parallelepiped shaped space.

14. A mounting structure according to claim 11, wherein said two transverse frames have an upside-down U-shape.

15. A mounting structure according to claim 11, comprising a second forward section located forward of said forward section.

16. A mounting structure according to claim 15, wherein said second forward section comprises two transverse frames spaced apart from each other, wherein one of said two transverse frames of said second forward section is connected to said forward section.

17. A mounting structure according to claim 16, wherein said second forward section comprises a second forward upper box extending between said two transverse frames of said second forward section and connecting a top part of each of the two transverse frames of said second forward section.

18. A mounting structure for mounting a turboprop under an aircraft wing, said structure comprising an aft under-wing box; a forward section located forward of said aft under-wing box, said forward section including two transverse frames spaced apart from each other, wherein one of said two transverse frames is connected to said aft under-wing box, said forward section comprising a forward upper box extending between said two transverse frames and connecting a top part of each of the two transverse frames of said forward section wherein said mounting structure extends along a longitudinal axis passing through said two transverse frames, and said aft under-wing box comprises a lower stringer extending along said longitudinal axis; an upper stringer extending along said longitudinal axis; two side walls extending along said longitudinal axis; and a plurality of transverse ribs connecting said lower stringer, said upper stringer and said two side walls to each other.

* * * * *